July 11, 1944. S. SCHNELL Re. 22,515

BRAKE SHOE MOUNTING

Original Filed Dec. 22, 1941 2 Sheets-Sheet 1

INVENTOR
STEVE SCHNELL

BY E. A. Huxham

ATTORNEY

July 11, 1944. S. SCHNELL Re. 22,515

BRAKE SHOE MOUNTING

Original Filed Dec. 22, 1941 2 Sheets-Sheet 2

INVENTOR
STEVE SCHNELL

BY

E. E. Kuppman

ATTORNEY

Reissued July 11, 1944

Re. 22,515

UNITED STATES PATENT OFFICE 22,515

BRAKE SHOE MOUNTING

Steve Schnell, Kirkwood, Mo., assignor to Wagner Electric Corporation, St. Louis, Mo., a corporation of Delaware Original No. 2,331,349, dated October 12, 1943, Serial 423,896, December 22, 1941. Application for reissue January 7, 1944, Serial No. 517,449

20 Claims. (Cl. 188—79.5)

My invention relates to brakes and more particularly to an improved brake shoe mounting.

One of the objects of my invention is to provide an improved brake shoe mounting which will permit the mounted end of the shoe to automatically move toward the drum and centralize the brake shoe in order to produce a self centering brake shoe at all times.

Another object of my invention is to provide an improved mounting for a brake shoe which will permit the anchored end to automatically adjust itself.

Yet another object of my invention is to provide an improved brake shoe mounting which will relieve toe grab when it tends to occur.

Still another object of my invention is to provide a brake shoe mounting which will insure that the force of the shoe acting through the anchor pin during braking will not change its angular relation with respect to a radial line of the brake assembly which is at right angles thereto.

Figure 1:
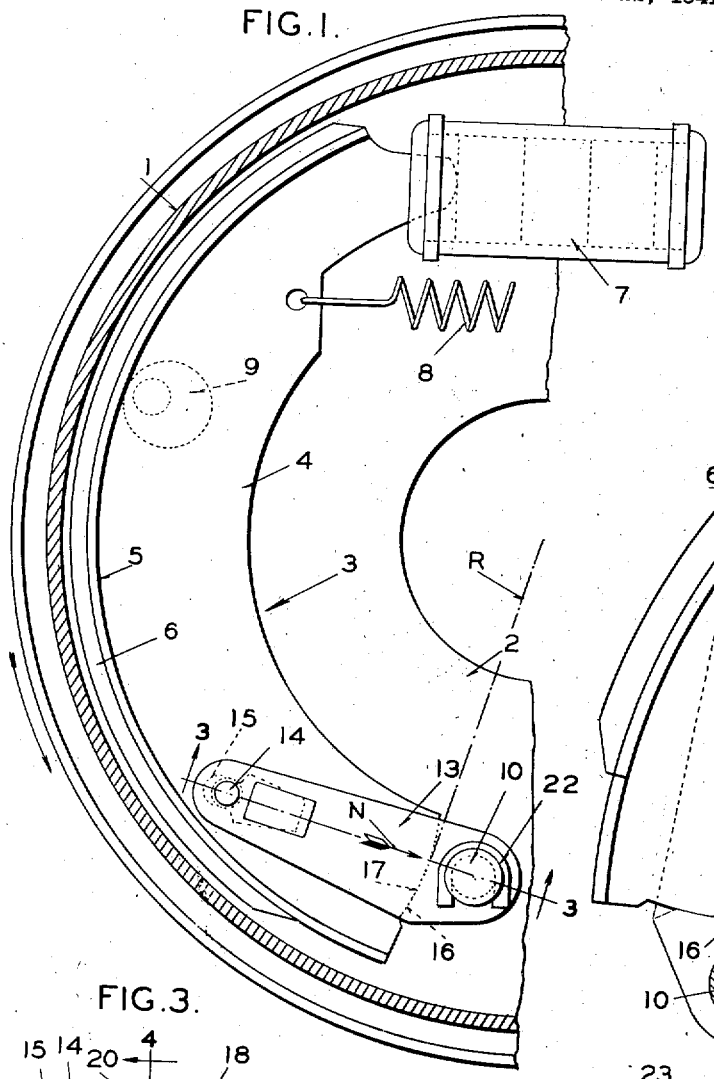
Figure 4:
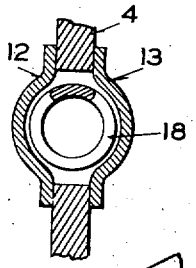
Figure 2:
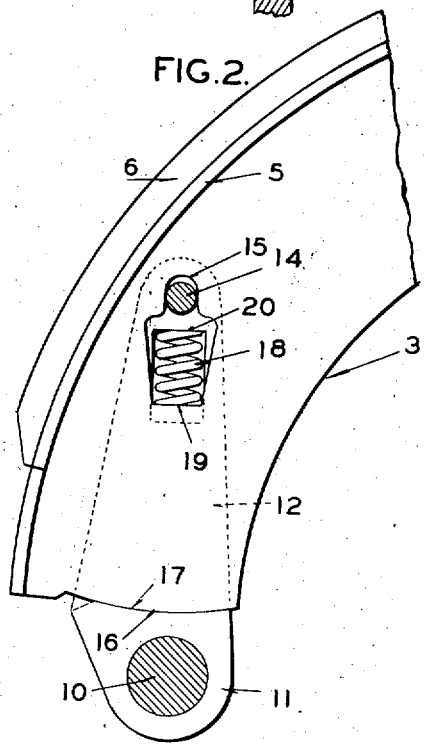
Figure 3:
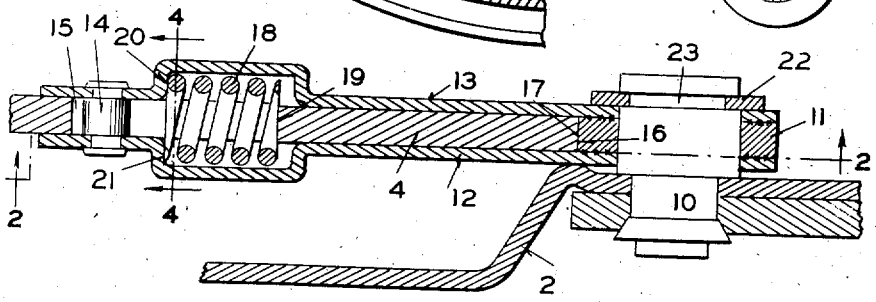
Figure 5:
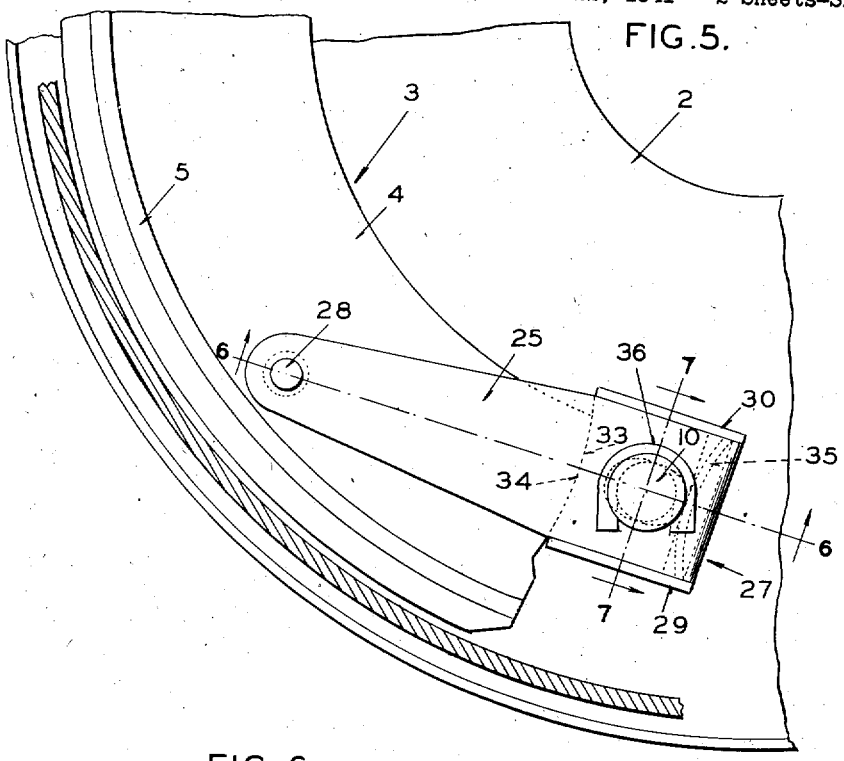
Figure 6:
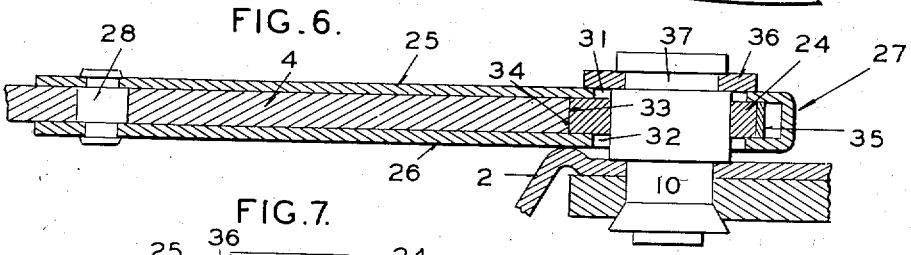
Figure 7:
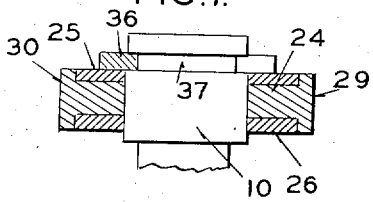

Other objects of my invention will become apparent from the following description taken in connection with the accompanying drawings wherein Figure 1 is a view of a portion of a brake assembly showing a brake shoe mounted on structure embodying my invention; Figure 2 is an enlarged view of the shoe mounting with a link removed; Figure 3 is a sectional view taken on the line 3—3 of Figure 1; Figure 4 is a sectional view taken on the line 4—4 of Figure 3; Figure 5 is a view of another mounting construction embodying my invention; and Figures 6 and 7 are sectional views taken on the lines 6—6 and 7—7, respectively, of Figure 5.

Referring in detail to Figures 1 to 4, the numeral 1 indicates the usual drum of a brake rotatable with a rotatable member and 2 is the fixed backing plate or support which closes the open side of the drum. Within the drum on one side thereof is shown a brake shoe 3 for cooperation with the drum, said shoe comprising a web 4 and a flange 5 to which is secured the lining 6. The toe end of the brake may be actuated by any suitable means, that shown being a fluid motor 7 of a hydraulic actuating system, said motor also being of such type as to actuate a like shoe on the opposite side of the drum. A spring 8 is employed to retract the shoe from the drum, the retracted position of the toe end being determined by the adjustable cam 9 carried by the backing plate.

The mounting for the heel end of the brake shoe which embodies my invention comprises a usual anchor pin 10 secured to the backing plate and pivotally mounted on this pin is a block 11 and two links 12 and 13 on opposite sides thereof, said block and links being secured together, as by welding, in order that relative rotative movement therebetween will not take place. The links 12 and 13 extend on opposite sides of the web of the brake shoe and have their ends remote from the anchor pin pivotally connected with the brake shoe by means of pin 14 secured to the links and positioned in a slot 15 in said web, the width of said slot being such as to snugly receive the pin.

The heel end of web 4 of the shoe is in abutting relation with block 11. The abutting surface 16 on the block is curved with its axis of curvature coinciding with the center of pin 14. The cooperating abutting surface 17 on the web of the shoe is of like curvature. By means of this curvature of the surfaces, the shoes can have relative rotative movement with respect to the links about pin 14 as an axis and the links can have rotation on the anchor pin. The surfaces will remain in abutting engagement over their entire areas, a relative sliding of the surfaces taking place. Whenever the links rotate on the anchor pin, block 11 will rotate with them so that the full area of the surfaces will always be in engagement. If it is assumed that the drum is rotating in the direction of the arrow when the shoe is applied, there will be produced a force acting on the anchor pin through block 11. This force is the resultant of the circumferential force acting on the shoe and caused by the drag of the drum on the lining and a second downward force acting on the shoe. This resultant force is designated by the arrow N in Figure 1. In order that the heel end of the shoe will have no tendency to move either toward or away from the drum during normal braking action (that braking action when all conditions of braking are theoretically perfect), this resultant force N should at all times be at right angles to a radial line of the drum center at the point where said force is transferred from the shoe to the anchor block. This is accomplished by the shoe mounting described. In the construction shown, this radial line will be tangent to the curved surfaces 16 and 17, the point of tangency coinciding with the point at which the force N acts. This relationship of the force N will always be at right angles to a radial line R which is tangent to the curved surfaces 16 and 17 regardless of drum expansion due to heat or of lining wear and throughout the working range of the brake shoe.

It is to be noted that the anchor pin will receive all the force resulting from that applied to the toe end of the shoe and that of the self-energizing action of the brake shoe. The links transmit no force due to the fact that pin 14 cannot be engaged by the end of slot 15.

The curved surfaces 16 and 17 are held in tight frictional engagement at all times and in order to accomplish this there is provided a coil spring 18 which is interposed between a shoulder 19 of the web and shoulders 20 and 21 on the links. The spring is positioned in an enlarged extension of slot 15, one end of which forms the shoulder 19, and the links are provided with recesses to receive portions of the spring and provide the shoulders 20 and 21. The spring is under axial compression and thus it applies a constant pressure holding surface 17 and the end of the shoe web in tight frictional engagement with surface 16. Because of the tight frictional engagement, the relative positions of surfaces 16 and 17 will always be maintained unless there is a superior force present causing a change.

The links and the anchor block are held on the anchor pin by a C-washer 22 cooperating with a groove 23 in the pin surface.

Referring to the operation of the brake shoe mounting just described, the block and the links are associated with the brake shoe and the anchor pin in the manner shown. When pressure is applied to the toe end of the shoe by the fluid motor, the shoe will swing about the anchor pin 10 into engagement with the drum. There will be no relative movement between the curved surfaces during the movement of the shoe to engage the drum due to the frictional engagement of these surfaces. If the shoe should be properly positioned or centered with respect to the drum when it engages the drum, it will engage the drum over the entire area of the brake shoe lining and without relative movement between the curved surfaces 16 and 17. As braking action takes place there will still be no relative movement between these curved surfaces as the force from the self-energizing action of the shoe acts through the surfaces onto the anchor pin and is so great that movement is prevented.

In the event the drum is distorted, the shoe is not properly positioned or centered in the drum or there has been uneven lining wear by a prior heavy brake application, then when the shoe is moved by the fluid motor to engage the drum there will be no relative movement between the curved surfaces until the shoe engages the drum. When engagement first takes place, the distorted drum, the uncentered condition of the shoe, or other conditions, will cause the toe of the shoe to become engaged prior to other parts of the shoe lining consequently causing a tendency to establish toe grab. This toe grab, however, will be prevented from developing for as soon as such begins to occur there will be a force established at the toe of the shoe which will act toward the mounted end of the shoe. This force will cause a shifting of the shoe and a relative movement between the curved surfaces. In other words, as soon as the force on the toe of the shoe is great enough to shift the shoe against the friction present between the curved surfaces, the shoe moves substantially radially of the drum and the toe gram will be relieved. As the shoe further engages the drum it will become properly positioned or centered and the entire surface of the lining will then engage the drum. Under additional actuating force the shoe performs its proper braking action and because it is capable of self-centering itself there will be maximum braking torque. After the shoe becomes centered and intended braking action takes place there will be no additional relative movement of the curved surfaces. The shoe acts then in the same manner as a properly positioned or centered rigid brake shoe mounted directly by its web on a fixed pivot.

When the shoe is properly positioned during braking action the right angle relationship between the force N and a radial line of the drum will exist since such is always present with the mounting arrangement shown for reasons already pointed out. The relationship thus insures that there will be no force tending to move the heel end of the shoe during braking. Such would not be the case if the surfaces 16 and 17 were flat and the links 12 and 13 eliminated as in prior anchor mountings.

When the shoe is centered and intended braking action is taking place, expansion of the drum due to heat will not cause any shifting of the shoe. The same is true as lining wear takes place during braking. However, this lining wear may result in an uneven contour of the lining and when the shoe is released and then subsequently applied this uneven contour may cause shifting and re-centering of the shoe as the shoe is again engaged.

When the shoe is released from the drum there will be no relative sliding movement between the curved surfaces 16 and 17 as the friction action caused by spring 18 prevents such and results in the shoe being rotated about the anchor pin in the same manner as a rigid shoe which has its web pivoted directly on the anchor pin.

If there has been expansion of the drum during braking and toe grab has occurred, then after the brake shoe has been released, a re-adjustment between the curved surfaces will take place. This will be caused by the contraction of the drum and a wiping action on the heel end of the shoe as the contraction reaches a point where there is contact with the lining. When the shoe is again engaged with the drum there will take place whatever adjustment is necessary to properly position the shoe relatively to the drum for full braking action without toe grab.

From the foregoing it is seen that a brake shoe mounting has been produced which will always permit the shoe to assume a proper position in the drum during braking. Toe grab will be prevented from developing regardless of whether it is caused by drum distortion, incorrect lining wear, abnormal friction, or any other causes and regardless as to whether any or all are present. The proper positioning or centering of the shoe takes place automatically each time the shoe is applied if centering is required. Regardless of what adjustment takes place to center the shoe there will be no unbalancing force present at the heel end since the force being transmitted to the anchor (force N) always remains at a right angle to a radial line passing through the point at which transfer occurs to the pivoted block on the anchor pin.

It is to be particularly noted that in the brake shoe mounting shown there is a sliding of the shoe end relative to pin 10 on a plane surface which is so arranged that when extended it will have a definite relation to the drum center. The shoe end moves in a path as determined by the curved surfaces which have their centers moved as the shoe moves outwardly due to the block being secured to the links and the links pivoted to the brake shoe.

Referring now to the construction shown in Figures 5, 6 and 7, the brake drum, the backing plate, and the brake shoe are indicated by the same references as in Figure 1, as is also the anchor pin upon which the shoe is to be mounted. On the anchor pin 10 is pivotally mounted an anchor block 24. The links for the mounting comprise legs 25 and 26 of a U-shaped strap 27, said legs extending on opposite sides of web 4 and being pivoted to the web by a pin 28. Relative rotation between the anchor block and the U-shaped strap is prevented by providing the block with flanges 29 and 30 which overlie the upper and lower edges of the legs of the strap. The openings 31 and 32 in the legs of the strap which receive the anchor pin are in the form of slots which permit the strap to have relative sliding movement with respect to the block and the anchor pin. The block 24 is provided with a curved surface 33 for cooperation with a curved surface 34 on the end of web 4 of the shoe, said surfaces having their axes of curvature coinciding with the axis of pin 28. In order that these surfaces may be held in tight frictional engagement, I have provided a strong leaf spring 35 which is interposed between the block and the closed end of the U-shaped strap. The sliding movement of the strap with respect to the block permits the force transmitted by the spring to cause the surfaces to have pressure engagement. A C-washer 36 cooperates with a groove 37 in the anchor pin to hold the U-shaped strap and the block on the anchor pin.

The operation of this mounting construction is the same as the construction shown in Figures 1 to 5. It is to be noted that there is no relative rotative movement permitted between the block 24 and the legs of the U-shaped strap. Thus, whenever the U-shaped strap is rotated about the anchor pin, the anchor block will also be rotated with it. Also, in this construction there is no force transmitted through the links from the brake shoes to the anchor block as all the force from the brake shoe to the block is transmitted directly through the curved surfaces which are always maintained in engagement.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking mechanism, a support, a brake drum, a brake shoe, means for actuating one end of the brake shoe, mounting means for the other end of the brake shoe including a pivoted anchor member for preventing circumferential movement of the shoe, other means permitting the shoe end to move outwardly relative to the anchor member to adjust said shoe substantially radially of said drum, and said other means including means for maintaining a predetermined fixed relationship between the direction of the resultant force acting on the anchor member when the shoe is engaged with the drum and a radial line of the brake assembly passing through the point at which the force acts on the anchor member regardless of expansion of the drum during braking or lining wear.

2. In braking mechanism, a support, a brake drum, a brake shoe, means for actuating one end of the brake shoe, mounting means for the other end of the brake shoe including a pivoted anchor member for preventing circumferential movement of the shoe, other means permitting the shoe end to move outwardly relative to the anchor member to adjust said shoe substantially radially of said drum, and said other means including means for causing the resultant force acting on the anchor member when the shoe is engaged with the drum to always be at right angles to a radial line of the brake assembly passing through the point at which the force acts on the anchor member regardless of expansion of the drum during braking or lining wear.

3. In braking mechanism, a support, a brake drum, a brake shoe, brake shoe mounting and adjusting means permitting pivotal movement of the shoe end comprising pivoted abutment means carried by the support at the end of the shoe for preventing circumferential movement of said shoe, other means permitting the shoe end to move outwardly toward the drum relative to the pivotal axis of the shoe to adjust said shoe substantially radially of said drum, said other means also so controlling the relationship between the shoe end and the abutment means that the force acting on the abutment means will always have a fixed relationship to a radial line of the brake assembly which passes through the point at which said force acts on the abutment means, and means for maintaining the shoe end in adjusted position.

4. In braking mechanism, a support, a brake drum, a brake shoe, means for actuating one end of the brake shoe, mounting means for the other end of the brake shoe including a pivoted anchor member for preventing circumferential movement of the shoe, other means permitting the shoe end to move outwardly relative to the anchor to adjust said shoe substantially radially of said drum, said other means including means for maintaining a predetermined fixed relationship between the direction of the resultant force acting on the anchor member when the shoe is engaged with the drum and a radial line of the brake assembly passing through the point at which the force acts on the anchor member regardless of expansion of the drum during braking or lining wear, and means for maintaining the shoe end in adjusted position.

5. In braking mechanism, a support, a brake drum, a brake shoe having a curved abutment surface at its mounted end, a pivoted member on the support provided with a like curved abutment surface for cooperation with the curved shoe end surface, and means for causing said pivoted member to be rotated by the shoe permitting the two abutment surfaces to have relative sliding movement when one or the other end of the shoe is engaged with the drum ahead of the other end to adjust said shoe substantially radially of said drum.

6. In braking mechanism, a support, a brake drum, a brake shoe having a curved abutment surface at its mounted end, a pivoted member on the support provided with a like curved abutment surface for cooperation with the curved shoe end surface, means for causing said pivoted member to be roated by the shoe permitting the two abutment surfaces to have relative sliding movement when one or the other end of the shoe is engaged with the drum ahead of the other end to adjust said shoe substantially radially of said drum, and means for maintaining the curved surfaces in pressure engagement.

7. In braking mechanism, a support, a brake drum, a brake shoe having a curved abutment surface at its mounted end, a pivoted member on the support provided with a curved abutment surface for cooperation with the curved shoe end surface, and means for so connecting the pivoted member to the shoe that said pivoted member will be rotated by the shoe when one or the other end of the shoe is engaged with the drum ahead of the other end to adjust said shoe substantially radially of said drum, said connecting means permitting the curved surfaces to have relative sliding movement.

8. In braking mechanism, a support, a brake drum, a brake shoe having a curved abutment surface at its mounted end, a pivoted member on the support provided with a curved abutment surface for cooperation with the curved shoe end surface, means for so connecting the pivoted member to the shoe that said pivoted member will be rotated by the shoe when one or the other end of the shoe is engaged with the drum ahead of the other end to adjust said shoe substantially radially of said drum, and said connecting means permitting the curved surfaces to have relative sliding movement and including means for maintaining said surfaces in pressure engagement so that said shoe and pivoted member will be held from relative movement when the shoe is engaged with and disengaged from the drum.

9. In braking mechanism, a support, a brake drum, a brake shoe having a convex curved abutment surface at its mounted end, a pivoted member on the support provided with a concave curved abutment surface for cooperation with the curved shoe end surface, means for causing said pivoted member to be rotated by the shoe permitting the two curved abutment surfaces to have relative movement when one or the other end of the shoe is engaged with the drum ahead of the other end to adjust said shoe substantially radially of said drum, and said means comprising a member pivoted to the shoe at a point coinciding with the axis of the curved surface on the end of the shoe.

10. In braking mechanism, a support, a brake drum, a brake shoe having a convex curved abutment surface at its mounted end, a pivoted member on the support provided with a concave curved abutment surface for cooperation with the curved shoe end surface, means for causing said pivoted member to be rotated by the shoe permitting the two abutment surfaces to have relative sliding movement when one or the other end of the shoe is engaged with the drum ahead of the other end to adjust said shoe substantially radially of said drum, said means comprising a member pivoted to the shoe at a point coinciding with the axis of the curved surface on the end of the shoe, and means for frictionally maintaining the curved surfaces in their relative positions.

11. In braking mechanism, a support, a brake drum, a brake shoe having a convex curved abutment surface at its mounted end, a pivoted member on the support provided with a concave curved abutment surface for cooperation with the curved shoe end surface, a link secured to the pivoted member pivoted to the shoe for causing said pivoted member to be rotated by the shoe permitting the abutment surfaces to have relative sliding movement when one or the other end of the shoe is engaged with the drum ahead of the other end to adjust said shoe substantially radially of said drum, said link being pivoted to the shoe at a point coinciding with the axis of the curved surface on the end of the shoe, and spring means for frictionally maintaining the curved surfaces in their relative positions.

12. In braking mechanism, a support, a brake drum, a brake shoe having a curved abutment surface at its mounted end, an anchor pin carried by the support, a bearing block pivotally mounted on the anchor pin provided with a curved abutment surface for cooperation with the curved shoe end surface, a link non-rotatably secured to the block and pivotally connected to the shoe rotatable by said shoe when the shoe moves substantially radially of said drum to adjust same relative to said drum without transmitting any force from the shoe to the anchor pin, said curved surfaces having the same radius of curvature with a common axis coinciding with the axis of the pivotal connection between the link and the shoe, and means for maintaining said curved surfaces in pressure engagement.

13. In braking mechanism, a support, a brake drum, a brake shoe having a curved abutment surface at its mounted end, an anchor pin carried by the support, a bearing block pivotally mounted on the anchor pin provided with a curved abutment surface for cooperation with the curved shoe end surface, links non-rotatably secured to opposite sides of the block pivotally connected to opposite sides of the shoe rotatable by said shoe when the shoe moves substantially radially of said drum to adjust same relative to said drum without transmitting any force from the shoe to the anchor pin, said curved surfaces having the same radius of curvature with a common axis coinciding with the axis of the pivotal connection between the links and the shoe, and spring means for maintaining said curved surfaces in pressure engagement.

14. In braking mechanism, a support, a brake drum, a brake shoe having a curved abutment surface at its mounted end, an anchor pin carried by the support, a bearing block pivotally mounted on the anchor pin provided with a curved abutment surface for cooperation with the curved shoe end surface, a link non-rotatably secured to the block and pivotally connected to the shoe rotatable by said shoe when the shoe moves substantially radially of said drum to adjust same relative to said drum without transmitting any force from the shoe to the anchor pin, said curved surfaces having the same radius of curvature with a common axis coinciding with the axis of the pivotal connection between the link and the shoe, and a spring interposed between abutments on the shoe and on the link and applying a force holding the curved surfaces in pressure engagement.

15. In braking mechanism, a support, a brake drum, a brake shoe having a convex curved abutment surface at its mounted end, a pivoted member on the support provided with a concave curved abutment surface for cooperation with the curved shoe end surface, a link non-rotatably secured to the pivoted member pivoted to the shoe for causing said pivoted member to be rotated by the shoe permitting the abutment surfaces to have relative sliding movement when one or the other end of the shoe is engaged with the drum ahead of the other end to adjust said shoe substantially radially of said drum, said link being pivoted to the shoe at a point coinciding with the axis of the curved surface on the end of the shoe, and means comprising a spring interposed between the link and the pivoted member for maintaining the curved surfaces in pressure engagement but permitting their relative sliding movement.

16. In braking mechanism, a support, a brake drum, a brake shoe having a curved abutment surface at its mounted end, an anchor pin carried by the support, a bearing block pivotally mounted on the anchor pin provided with a curved abutment surface for cooperation with the curved shoe end surface, a U-shaped link receiving the block and being non-rotatably secured to the block but capable of relative sliding movement thereto in the direction of its length, means for pivotally connecting the ends of the legs of the U-shaped link to the shoe on opposite sides thereof so that the link and block will be rotated by the shoe when one end of the shoe engages the drum ahead of the other end of the shoe to substantially radially adjust said shoe relative to said drum, said curved surfaces having the same radius of curvature with a common axis coinciding with the axis of the pivotal connection between the link and the shoe, and a spring interposed between the base of the U-shaped link and the block for holding the curved surfaces in pressure engagement.

17. In braking mechanism, a support, a brake drum, a brake shoe provided with friction lining, means for actuating one end of the brake shoe, means for mounting the other end of the brake shoe on the support, said mounting means comprising anchor means for preventing circumferential movement of the shoe, and other means permitting movement of the mounted end of the shoe toward the drum in the event the shoe when applied to the drum by the actuating means initially engages the drum at its actuated end prior to engagement of other parts of the shoe, said other means which permits the shoe movement embodying means for maintaining a predetermined fixed relationship between the direction of the resultant force acting on the anchor means and a radial line of the brake assembly passing through the point at which the force acts on said anchor means regardless of the position assumed by the shoe when engaged with the drum during braking.

18. In braking mechanism, a support, a brake drum, a brake shoe provided with friction lining, means for actuating one end of the brake shoe, means for mounting the other end of the brake shoe on the support, said mounting means comprising anchor means for preventing circumferential movement of the shoe, and other means permitting movement of the mounted end of the shoe toward the drum in the event the shoe when applied to the drum by the actuating means initially engages the drum at its actuated end prior to engagement of other parts of the shoe to adjust said shoe substantially radially of said drum, and said other means which permits the shoe movement embodying means for controlling the direction of the force being transmitted to the anchor means that the mounted end of the shoe will be so acted upon by any force to prevent movement substantially radially of said shoe relative to said drum during braking action.

19. In braking mechanism, a support, a brake drum, a brake shoe provided with friction lining, means for actuating one end of the brake shoe, means for mounting the other end of the brake shoe on the support, said mounting means comprising anchor means for preventing circumferential movement of the shoe, and other means including abutting curved surfaces arranged to permit movement of the mounted end of the shoe toward the drum in the event the shoe when applied to the drum by the actuating means initially engages the drum at its actuated end prior to engagement of other parts of the shoe to adjust said shoe substantially radially of said drum, and said other means embodying means for so controlling the relationship of the curved surfaces that force will be established in a direction at the mounted end of the shoe which will act to prevent movement substantially radially of said shoe relative to said drum during braking and regardless of the position assumed by the shoe after being moved as a result of said initial engagement of the actuated end.

20. In a brake device, a backing plate, a brake drum rotatable relatively thereto, a brake shoe disposed within said drum, a pivot pin fixed to said backing plate, an element engaging said pin provided with a curved surface, said shoe having its one end curved complementary to said curved surface, and means to keep said curved surfaces in frictional engagement with each other which includes a link element pivoted to said pin and mounted for movement relatively of said shoe, said surfaces moving relatively of each other when said shoe is moved substantially radially of said drum to adjust said shoe with respect to said drum, and a resilient element to urge said curved surfaces into a frictional engagement.

STEVE SCHNELL.